United States Patent
Milano, Jr. et al.

Patent Number: 5,211,274
Date of Patent: May 18, 1993

[54] OVERRIDING CLUTCH
[75] Inventors: Arthur J. J. Milano, Jr., Burlington; W. H. Tuppeny, Jr., Simsbury, both of Conn.
[73] Assignee: Seitz Corporation, Torrington, Conn.
[21] Appl. No.: 865,184
[22] Filed: Apr. 8, 1992
[51] Int. Cl.$^5$ .................................. F16D 41/06
[52] U.S. Cl. .......................... 192/45; 192/41 R; 188/82.84
[58] Field of Search ............... 192/45, 41 R, 44; 188/82.84

[56] References Cited

U.S. PATENT DOCUMENTS

| | | | |
|---|---|---|---|
| 2,490,172 | 12/1949 | Swahnberg | 192/45 |
| 3,055,471 | 9/1962 | Warn et al. | 192/45 |
| 3,221,850 | 12/1965 | Bacon | 192/45 |
| 3,260,333 | 7/1966 | Benson et al. | 192/45 |
| 3,350,148 | 10/1967 | Sanguinetti et al. | 308/187.2 |
| 3,441,189 | 4/1969 | Erb et al. | 226/189 |
| 3,454,314 | 7/1969 | Sanguinetti | 308/191 |
| 3,478,382 | 11/1969 | Nosenzo | 16/44 |
| 3,500,977 | 3/1970 | Gehrke | 192/45 |
| 3,512,856 | 5/1970 | Robinson | 308/184 |
| 3,513,480 | 5/1970 | Robinson | 308/184 |
| 3,549,220 | 12/1970 | Robinson | 308/184 |
| 3,619,017 | 11/1971 | Robinson et al. | 308/184 |
| 3,750,782 | 8/1973 | Constantini et al. | 192/45 |
| 3,760,914 | 9/1973 | Gelbrich | 192/45 |
| 3,875,813 | 4/1975 | Murata et al. | 74/130 |
| 3,917,036 | 11/1975 | Johnson et al. | 192/45 |
| 3,937,312 | 2/1976 | Gehrke | 192/45 |
| 4,054,192 | 10/1977 | Johnson | 192/45 |
| 4,088,211 | 5/1978 | Doller et al. | 192/45 |
| 4,185,724 | 1/1980 | Kitchen | 192/45 |
| 4,187,937 | 2/1980 | Kitchen | 192/45 |
| 4,236,619 | 12/1980 | Kuroda | 192/45 |
| 4,422,537 | 12/1983 | Ritter et al. | 192/45 |
| 4,620,806 | 11/1986 | Rabe | 384/572 |
| 4,660,698 | 4/1987 | Miura | 192/45 |
| 4,664,237 | 5/1987 | Lederman et al. | 192/45 |
| 4,667,788 | 5/1987 | Johnston et al. | 192/45 |
| 4,679,676 | 7/1987 | King et al. | 192/45 |
| 4,711,330 | 12/1987 | Lederman | 192/45 |
| 4,712,661 | 12/1987 | Lederman et al. | 192/45 |
| 4,724,940 | 2/1988 | Lederman | 192/45 |
| 4,757,887 | 7/1988 | Ostrander et al. | 192/41 A |
| 4,787,490 | 11/1988 | Lederman et al. | 192/45 |
| 4,821,856 | 4/1989 | Lederman | 192/45 |
| 4,828,085 | 5/1989 | Lederman | 192/45 |
| 4,828,086 | 5/1989 | Lederman | 192/45 |
| 4,830,157 | 5/1989 | Lederman | 192/45 |
| 4,834,227 | 5/1989 | Lederman | 192/45 |
| 4,878,569 | 11/1989 | Schaeffler | 192/45 |
| 4,893,702 | 1/1990 | Lederman | 192/45 |
| 4,901,833 | 2/1990 | Lederman | 192/45 |
| 4,915,201 | 4/1990 | Stark et al. | 192/45 |
| 4,921,084 | 5/1990 | Lederman | 192/45 |
| 4,924,980 | 5/1990 | Lederman | 192/45 |
| 4,924,981 | 5/1990 | Johnston et al. | 192/45 |
| 4,932,508 | 6/1990 | Lederman | 192/45 |
| 4,953,353 | 8/1990 | Lederman | 60/345 |
| 4,986,402 | 1/1991 | Neuwirth et al. | 192/45 |
| 4,987,670 | 1/1991 | Papania | 29/451 |
| 4,989,705 | 2/1991 | Kashio et al. | 192/45 |
| 4,993,528 | 2/1991 | Lederman | 192/45 |
| 4,995,489 | 2/1991 | Lederman | 192/45 |

FOREIGN PATENT DOCUMENTS 2134618  1/1973  Fed. Rep. of Germany ........ 192/45

Primary Examiner—Rodney H. Bonck
Assistant Examiner—Andrea Pitts

[57] ABSTRACT

An overriding clutch adapted for use within both metallic and synthetic resin structures has a housing of generally annular cross section with at least three equidistantly spaced recesses about its inner periphery each having a radial throat portion and a secantally extending portion elongated in the direction opposite the normal direction of rotation of the shaft. The radially outer surface of the secantal portion has a secantally extending rectilinear ramp portion which is inclined to a smaller radial dimension. A roller bearing in the recess has a diameter slightly larger than the throat, and the radial depth of the recess to the ramp surface is less than the diameter of the roller bearing so that the outer circumference of the roller bearing extends radially inwardly of the housing to provide a bearing surface for the shaft. A spring in the elongated portion of the recess biases the roller along the ramp surface. The housing has a wall thickness outwardly of the recess sufficient to resist deformation under normal stresses placed thereon through the bearing by the torque applied to the shaft, but it is resiliently deformable by excess torque on the shaft to allow the clutch to override.

14 Claims, 10 Drawing Sheets

| TORQUE | | NUMBER OF CYCLES | | | |
|---|---|---|---|---|---|
| IN. LBS | N m | φ 4 mm SHAFT | φ 6 mm SHAFT | φ 8 mm SHAFT | φ 10 mm SHAFT |
| 3 | 0.33 | ∞ | | | |
| 4 | 0.45 | 1 000 000 | ↑ | | |
| 5 | 0.56 | 250 000 | ∞ | ↑ | |
| 6 | 0.68 | 90 000 | 1 000 000 | | |
| 7 | 0.79 | 35 000 | 350 000 | ∞ | ↑ |
| 8 | 0.90 | 10 000 | 150 000 | 1 000 000 | |
| 9 | 1.02 | | 80 000 | 500 000 | ∞ |
| 10 | 1.13 | | 40 000 | 250 000 | 1 000 000 |
| 15 | 1.69 | | | 20 000 | 90 000 |
| 20 | 2.26 | | | | 15 000 |
| 25 | 2.82 | | | | |
| 30 | 3.38 | | | | |
| 35 | 3.95 | | | | |

∞ - MORE THAN 1 MILLION CYCLES

OVERRIDING CLUTCH

BACKGROUND OF THE INVENTION

The present invention relates to one way clutches, and more particularly to a novel one way clutch which may be readily assembled from relatively few components.

One way clutches are utilized in a variety of applications, such as for transfer of forces between a rotating shaft and surrounding structures such as a gear or a pulley. As is well known, it is desirable that such clutches permit overriding when excess torque is applied thereto through the rotating shaft in order to avoid damage to the clutch and to the structure in which it is seated.

Although various types of overriding one way clutch structures are known, clutches which employ roller bearings to provide frictional engagement between the shaft and the housing of the bearing to effect the torque transmission to the surrounding structure have enjoyed particular success. Much effort has been devoted to simplifying these structures in terms of fabrication and assembly. Illustrative of such one way clutches are Miura U.S. Pat. No. 4,660,698 granted Apr. 28, 1987; Lederman U.S. Pat. No. 4,932,508 granted Jun. 12, 1990; and Kashio et al U S. Pat. No. 4,989,705 granted Feb. 5, 1991.

Although the clutch illustrated in these patents and other patents of the general type have enjoyed substantial success and are widely employed in many applications, there has remained a desire to create an overriding one way clutch structure which may be assembled quickly and easily from relatively few parts, prior to assembly to the other components. It is also desirable to create such a clutch which may be readily adapted to various sizes of shafts and torque loading and readily fabricated in accordance with easily established design parameters. Moreover, it is desirable that such clutch assemblies exhibit reasonably long life despite being repeatedly subjected to overloads causing the clutch to override.

It is an object of the present invention to provide a novel one way overriding clutch which is relatively simple to fabricate from relatively few parts, and which will exhibit relatively long life.

It is also an object to provide such an overriding clutch which employs parameters permitting its facile adaptation to various sizes of shafts, units to be driven thereby, and torque loadings.

Another object is to provide such an overriding clutch which may be readily fabricated to provide assembly in which bearings and springs are retained in the housing and which will exhibit relatively long life despite relatively frequent override conditions.

SUMMARY OF THE INVENTION

It has now been found that the foregoing and related objects may be readily attained in an overriding clutch adapted for use within both metallic and synthetic resin structures comprising a housing of generally annular cross section with at least three recesses equidistantly spaced about the inner periphery thereof. The recesses have a radial throat portion opening at the inner periphery and a generally secantally extending portion spaced from said inner periphery and elongated in the direction opposite the normal direction of rotation of the shaft which it is to receive. The radially outer surface of the secantally extending portion has a secantally extending rectilinear ramp portion which is inwardly inclined to a smaller radial dimension in the direction of shaft rotation.

Seated in each recess is a roller bearing having a diameter slightly larger than the throat so as to be radially retained in the recess. The radial depth of the recess to the ramp surface is less than the diameter of the roller bearing so that the outer circumference of the roller bearing extends radially inwardly of the inner periphery of the housing to provide a bearing surface for the shaft seated therein. Resiliently deflectable biasing means is provided in the elongated portion of each recess, and it biases the roller bearing away therefrom and along the ramp surface.

The roller bearing is seated directly on and directly bears upon the surface of the housing defining the ramp surface and applies forces thereto along essentially a line extending axially of its periphery.

The housing has a wall thickness outwardly of the recess sufficient to resist deformation under normal stresses placed thereon through the bearing by the torque applied to the shaft but is resiliently deformable by excess torque on the shaft, whereupon the clutch will override.

Preferably, the housing is fabricated from sintered metal, which is conveniently ferrous. The bearing means is a leaf spring which is a reversably bent member having a pair of legs with the radially inwardly disposed leg initially diverging from its juncture with the other leg and having its end portion inclined towards the other leg.

Generally, the recesses have an arcuate portion extending from the ramp portion to the side of the throat opposite the elongated portion. The clutch also includes an end portion on the housing to limit axial movement of the biasing means and bearings in the recesses, and it retains them in the recesses.

Preferably, the housing has four to eight recesses with bearings therein, and the ramp surface is inclined at an angle of about 9° from an imaginary line perpendicular to a radial line extending through its end of smaller radial dimension.

Most desirably, the housing wall thickness ($D_m$) underlying the recess is at least equal to the larger of the following equations:

$$D_m = \left[ \frac{N}{2B\sigma} \left( 6K_{bi}A \left( \frac{\cos\theta_1}{\sin\theta} - \frac{1}{\theta} \right) + K_{ti} \frac{\cos\theta_1}{\sin\theta} \right) \right]^{\frac{1}{2}}$$

OR $$D_m = \left[ \frac{N}{2B\sigma} \left( \frac{1}{\tan\theta} - 6K_{bo}A \left( \frac{1}{\tan\theta} - \frac{1}{\theta} \right) \right) \right]^{\frac{1}{2}}$$

wherein the several factors seen in FIG. 6 are as follows:

$D_m$ = minimum wall thickness underlying the ramp surface

N = normal force transmitted to the housing by the roller bearing which is a vector of the force proportional to the normal torque on the shaft. ,71

$$N = \frac{T}{n \cdot R_s \cdot \tan\left(\frac{\alpha}{2}\right)}$$

T = input torque
n = number of recesses
$R_S$ = shaft radius
$\alpha$ = recess angle
R = $AD_m$ = housing radius
t = $BD_M$ = housing thickness
A = input constant (assumed or manipulated)
B = input constant
$\sigma$ = allowable working stress
$K_{bi}$ = stress concentration factor in bending including curved beam effect on the inside of housing OR
$K_{bo}$ = stress concentration factor in bending including curved beam effect on the outside of housing
$K_{ti}$ = stress concentration factor from hoop effect on inside of housing and wherein the optimum value of $\cos \theta_1$ is equal to the following:

$$\cos\theta_1 = \left[ \frac{\frac{\cos\theta}{\sin\theta} + 6K_{bo}A\left(\frac{1}{\theta} - \frac{\cos\theta}{\sin\theta}\right) + \frac{6K_{bi}A}{\theta}}{\frac{6K_{bi}A}{\sin\theta} + \frac{k_{ti}}{\sin\theta}} \right]$$

wherein $$\theta = \frac{\pi \text{ radians}}{\text{no. of recesses}}$$

DETAILED DESCRIPTION OF THE ILLUSTRATED EMBODIMENTS

Figure 1:
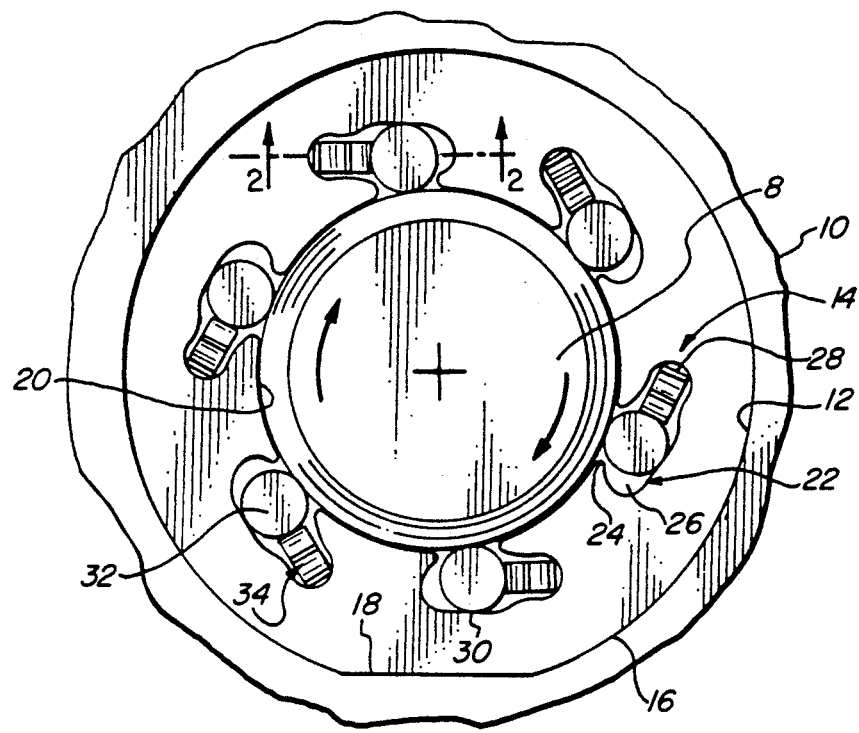
FIG. 1 is a fragmentary end elevational view of a clutch assembly embodying the present invention as disposed within a fragmentarily illustrated gear and about a shaft.

Turning first to FIG. 1 of the attached drawings, therein illustrated is a fragmentarily illustrated gear 10 having a bore 12 in which is seated a clutch assembly embodying the present invention. The clutch assembly includes a housing of generally annular configuration generally designated by the numeral 14 with an outer periphery 16 which is generally circular except for a flat 18 at a point spaced thereabout to enable it to be securely retained against relative rotation within the bore 12 of the gear 10. The inner periphery 20 has a series of six equidistantly spaced recesses generally designated by the numeral 22. As can be seen, each recess 22 has a throat portion 24 opening at the inner periphery 20 and a generally secantally extending portion 24 elongated in the direction opposite to the direction of shaft rotation, and it provides a pocket 28 to one side of the throat portion 24.

Figure 5:
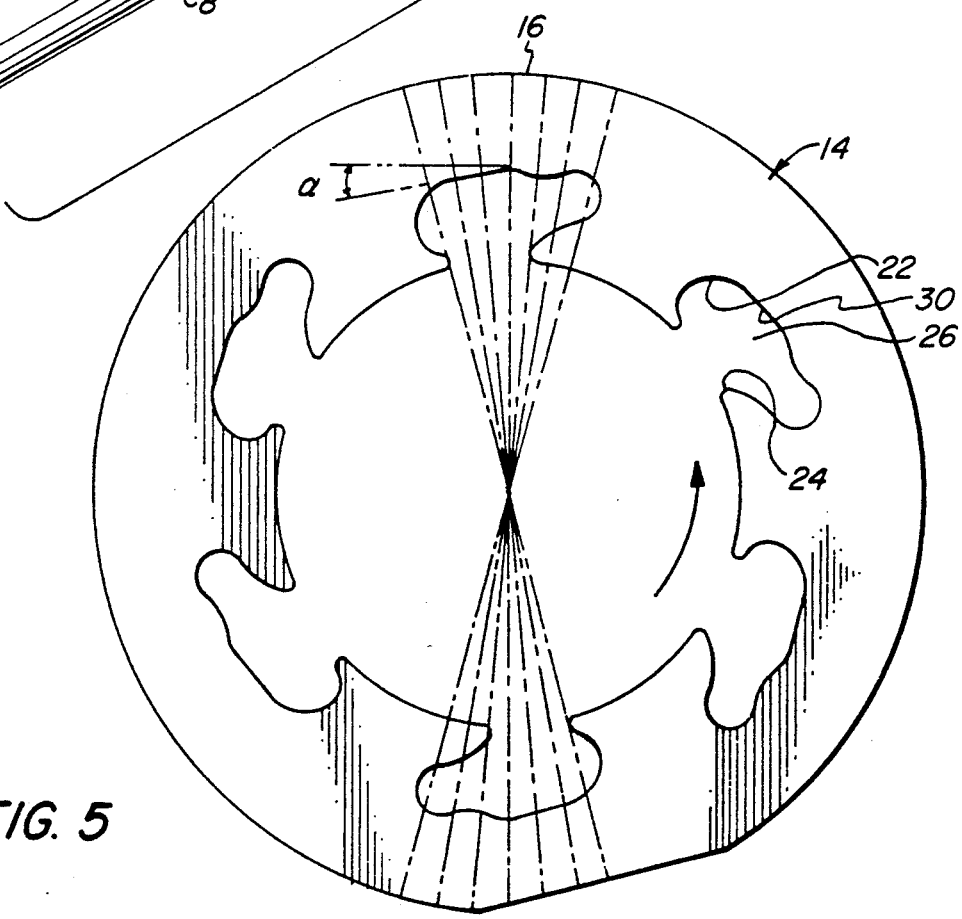
FIG. 5 is a schematic view of the housing, reversed in orientation from that in FIGS. 1-4 and; showing the variation in thickness underlying the recess which seats the roller bearing.

As best seen in FIG. 5, the secantally extending portion 26 has a ramp surface 30 underlying the throat portion 24, and it is inclined towards the inner periphery in the direction of shaft rotation at an angle a. Thus, the radial distance to the ramp surface 30 decreases in the direction of shaft rotation.

Seated in each recess 22 is a roller bearing 32 having a diameter slightly larger than the width of the throat portion 24 so that the roller bearing 32 is retained in the recess 22. Moreover, the diameter of the bearings 32 and the radial distance from the inner periphery 20 to the ramp surface 30 is such that a circumferential portion of the roller bearing 32 projects outwardly of the throat portion 24 and beyond the inner periphery 20 of the housing 14 to provide the contact bearing surface for the shaft 8. Leaf springs generally designated by the numeral 34 bias the roller bearings 32 in the direction of shaft rotation, i.e., away from the pocket 28 and along the ramp surface 30. The roller bearings 32 seat directly on and bear directly upon the ramp surface 30 of the housing 14 and transmits forces thereto along essentially a line extending axially of its periphery.

Figure 2:
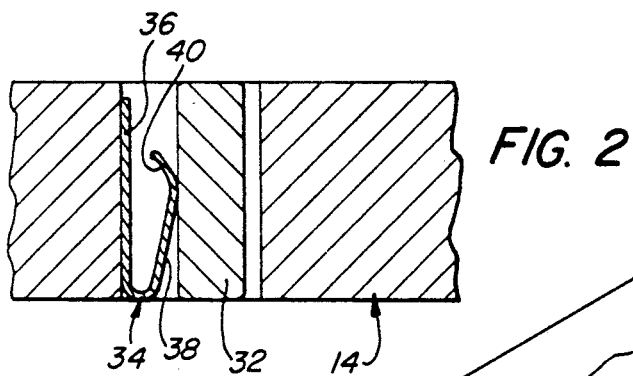
FIG. 2 is a fragmentary sectional view thereof along the line 2—2 of FIG. 1 and drawn to an enlarged scale.
Figure 3:
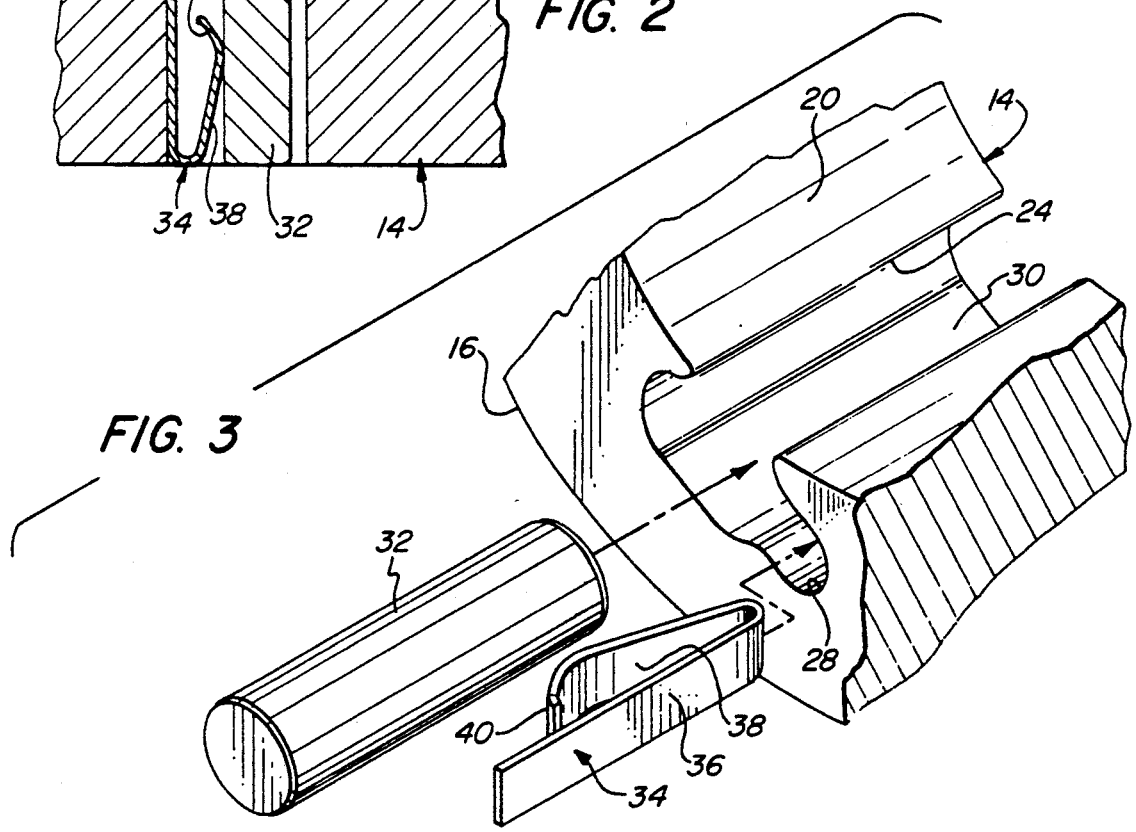
FIG. 3 is a exploded fragmentary perspective view of the clutch assembly of FIGS. 1 and 2 drawn to an enlarged scale.

As best seen in FIGS. 2 and 3, the roller bearings 32 are cylindrical in configuration, although they conventionally employ chamfered ends. The leaf springs 34 have a generally rectilinear first leg 36 which bears against the end surface of the pocket 28 of the secantally extending portion 26, and a second leg 38 which initially diverges from its juncture with the first leg 36 and then has an inwardly bent portion 40.

Figure 4:
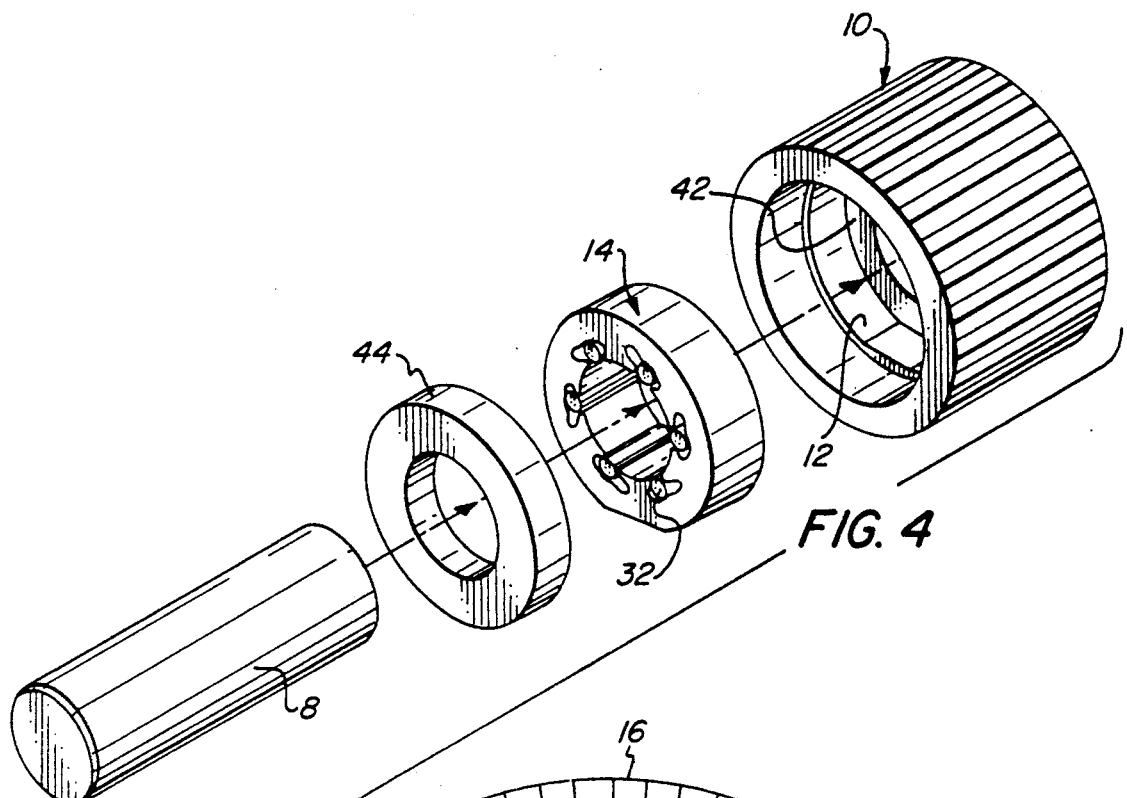
FIG. 4 is a partially exploded view of the assembly of FIG. 1.

As can be seen in FIG. 4, the leaf springs 34 and roller bearings 32 can be preassembled in the recesses 22 of the housing 14 and then slid inwardly into the bore 12 of the gear 10 in that preassembled form.

The movement of the leaf springs 34 and roller bearings 32 axially within the gear 10 is precluded by their abutment against the radially extending shoulder 42. Once inserted into the bore 12, their movement in the opposite direction is precluded by the end cap 44.

Following insertion of the clutch assembly into the gear 10, the shaft 8 may be introduced into its bore, desirably by effecting its rotation in the opposite direction as it is being pushed axially inwardly.

Turning again to FIG. 5, it can be seen that the ramp surface 30 not only produces a decreasing radial spacing along which the roller bearing 32 moves in the direction of rotation, but it also results in an increase in the thickness of the wall between the recess 22 and the outer periphery 16 of the housing 14.

As will be readily appreciated, clutch design requires a number of mechanical considerations, the first of which is the torque/loading relationship between the shaft, the clutch and the surrounding structure. A stress analysis of the clutch involves consideration of contact stresses, housing bending and hoop stresses, the effects of tolerances, dynamic stresses in terms of the allowable revolutions per minute and life curves based upon the torque to which the clutch will be subjected. In addition, the clutch deflection behavior must involve consideration of static torque capacity, housing stiffness or resistance to hooping and thermal expansion.

To provide a multipurpose, reasonably economical clutch, one must consider all of these factors and effect such compromises as are appropriate to achieve a desired balancing of characteristics.

Figure 6:
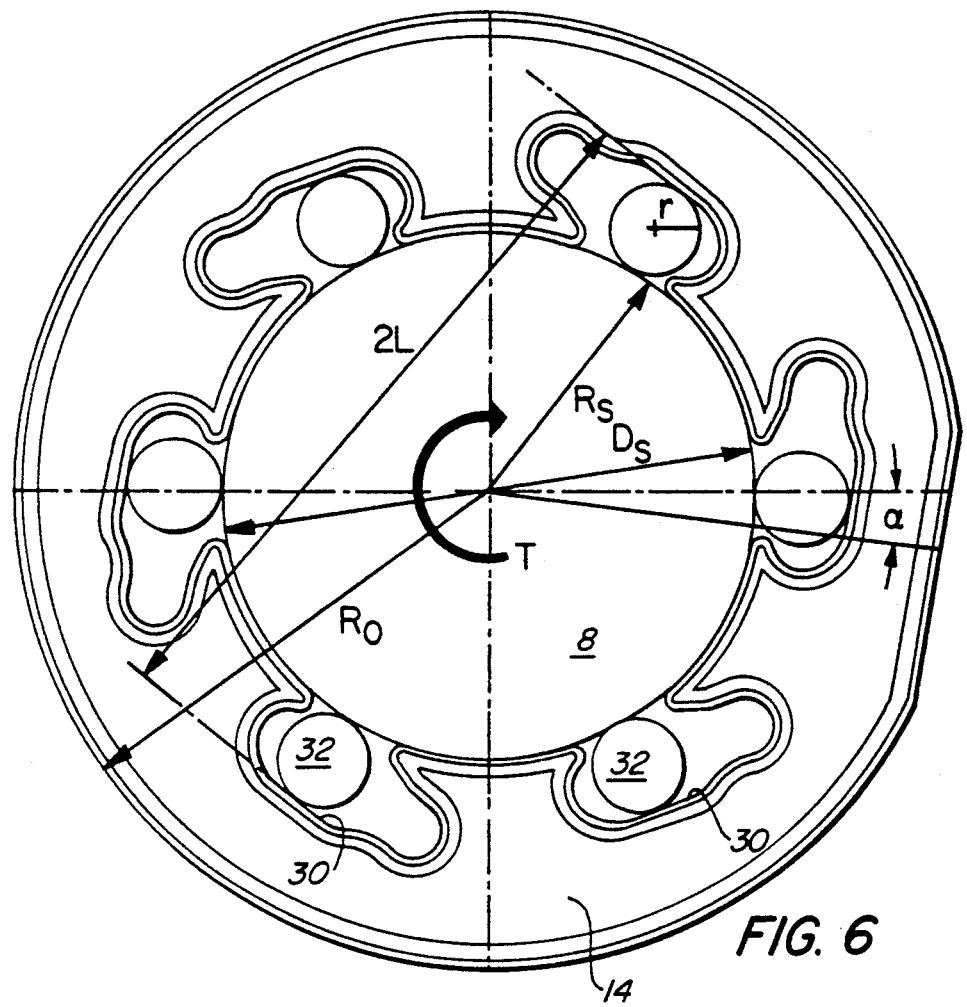
FIGS. 6-8 are diagrammatic illustrations utilized to identify the various factors required for consideration in determining the design parameters for a clutch embodying the present invention the housing in FIGS. 6 and 8 being reversed in orientation from that in FIGS. 1-4.

Turning next to FIG. 6, it can be seen that, the friction forces between the shaft 8 and the roller bearings 32, and between the roller bearings 32 and the ramp surfaces 30 of the housing 14 will wedge the roller bearings 32 by reason of the decreasing spacing as the roller bearing 32 move along the ramp surface 30. This results in the transmission of forces and torque into the housing 14, and this torque can be increased until the clutch components deflect sufficiently to overcome the dimensional interference between the shaft 8 and the roller bearings 32 and the distance between opposing ramp surfaces 30 increases.

As torque is applied to the shaft, friction forces between the shaft 8 and roller bearings 32 and between the roller bearings 32 and housing ramp surfaces 30 wedge the roller bearings 32. Thus forces and torque are transmitted into the wall of the housing 14. The torque can be increased until the clutch components deflect sufficiently to overcome the dimensional interference between the shaft and roller bearings 32 diameters and the distance between opposing ramp surfaces 30. At this point the clutch will override. Reversing the direction of rotation of the shaft 8 cause the roller bearings 32 to move up the ramp surface 30 to unlock and disengage from functional engagement with the housing 14.

The factors for solving the known equations are as follows:
Applied Torque = T, in-lbs
Shaft Radius = $R_s$, in
Roller Radius = r, in
Number of Rollers = n
Ramp Span = 2 L
Ramp Angle = $\alpha$
Shaft Dia = $D_x$
Roller Diameter = d
Housing Thickness = t
Housing O.D. = 2 $R_0$ The torque applied through the shaft 8 is transmitted to the housing 14 by friction forces between the shaft 8 and roller bearings 32 according to the following equation:

$$\bar{T} = \sum_{i}^{n} \bar{F}_x \cdot R_s = n \cdot \bar{F}_x \cdot R_s \quad (1)$$

Figure 7:
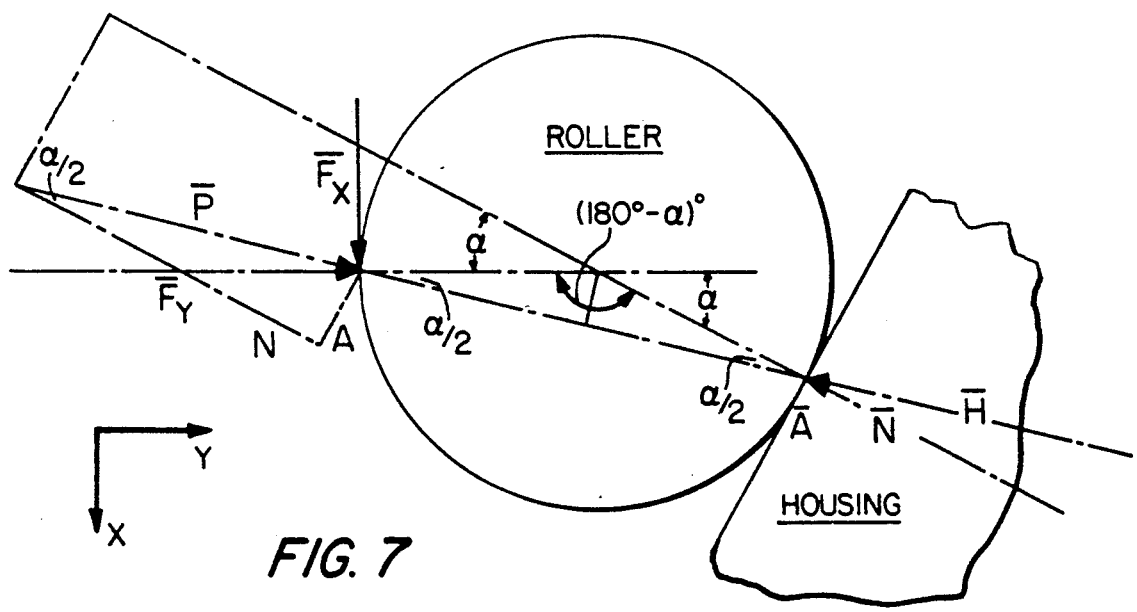

Turning next to FIG. 7, the torque force relationships may be evaluated in a roller force free body diagram:
Friction force between shaft and roller = $\bar{F}_x$
Normal force between shaft and roller = $\bar{F}_y$
Friction force between roller and housing = $\bar{A}$
Normal force between roller and housing = $\bar{N}$
$\bar{P}$ = Resultant Force
$\bar{H}$ = Resultant Force The equation of equilibrium are:
(a) $\Sigma \bar{F}_y = 0 \quad \Sigma \bar{F}_y - \bar{N} \cos \alpha = A \sin \alpha = 0$ (b) $\Sigma \bar{F}_x = 0 \quad \Sigma \bar{F}_x + \bar{A} \cos \alpha - N \sin \alpha = 0$ (c) $\Sigma \bar{T} = 0 \quad \Sigma \bar{T} = \bar{F}_a \times \bar{R}_s - \bar{A} \times \bar{R}_2 = 0$ Rearranging (b) and substituting (c) yields $\bar{F}_x + \bar{F}_x \cos \alpha = \bar{N} \sin \alpha$ Further rearranging yields $$\frac{\bar{F}_x}{\sin \alpha} + \frac{\bar{F}_x}{\tan \alpha} = \bar{N}$$

But for small angles Sin $\alpha$ = Tan $\alpha$ = $\alpha$ In radians $$\bar{N} = \frac{\bar{F}_x}{\alpha/2} = \frac{\bar{F}_x}{\tan \alpha/2} \quad (2)$$

Rearranging Equation (1)

$$\bar{F}_x = \frac{\bar{T}}{m \cdot R_s}$$

and substituting into Equation (2), yields $$\bar{N} = \frac{\bar{T}}{m \cdot R_s \cdot \tan \alpha/2}$$

Where N = normal force between a roller and the housing.

The preferred basic clutch assemblies have six rollers and hence the housings have six normal loads imposed on them. These normal loads form the base loads which establish the stress distribution and deflection characteristics of the housing.

It will be appreciated that there are a variety of stresses which result from the torque load patterns imposed on a clutch mechanism. These stresses must be evaluated and controlled to fall below levels which will allow the clutch to function over a number of repeated loading cycles without failing. Therefore, it is necessary to establish the fatigue life characteristics of all clutch components.

The first type of stress field to be examined involves the local stresses acting at the surface between the shaft and the roller bearings and between the roller bearings and the housing.

If these stresses are excessive, they will result in galling of the surfaces which will cause the clutch mechanisms to lose torque carrying and override ability.

The generalized equation for these "contact stresses" was developed by Hertz and is given as follows:

$$\sigma_c = 0.798 \left[ \frac{\frac{\hat{P}}{2} \left( \frac{1}{r} + \frac{1}{R_s} \right)}{\frac{1 - M_1^2}{E_1} + \frac{1 - M_2^2}{E_2}} \right]^{\frac{1}{2}}$$

Where

-continued $$\hat{P} = \text{Line Load} = \frac{N}{t} = T\left(\frac{1}{t \cdot n \cdot R_s \cdot \tan\alpha/2}\right)$$

$M_1$, $M_2$ = Poisson's ratio of the shaft and rollers = 0.3 $E_1$, $E_2$ = Modulus of elasticity of shaft and rollers-27×10$^6$ psi This equation can be reworked into a form which allows the stresses to be compared to experimental data on fatigue life of hardened steel roller bearings and shafts.

$$\hat{P} = \frac{N}{t} = \frac{K_c}{\frac{1}{r} + \frac{1}{R_s}}$$

where $$K_c = \frac{2\sigma_c^2}{0.35E}$$

Accordingly, for the roller bearing/shaft combination, the allowable torque is:

$$T = \frac{K_c \cdot t \cdot n \cdot R_s \cdot \tan\alpha/2}{\frac{1}{r} + \frac{1}{R_s}} \quad (4)$$

Contact stresses between the roller bearings and the housing can be evaluated from the generalized equation which ends up taking the form:

$$\sigma_c = 0.59\left[\frac{\hat{P}}{r} \cdot \frac{E_r E_H}{(E_r + E_H)}\right]^{\frac{1}{2}} \text{ with } E_H = 2/3 E_R$$

$$\sigma_c = 0.59\left[\frac{\hat{P}}{r} \cdot 2/5 \cdot E_R\right]^{\frac{1}{2}} \quad \overline{K}_c = \frac{P}{r} = \frac{\sigma_c^2 \cdot 5 E_H}{0.7}$$

With $\overline{K}_c$ = the contact stress factor for the housing material. Accordingly, for the roller bearing/housing combination, the allowable torque is:

$$T = \frac{\overline{K}_c \cdot t \cdot n \cdot R_s \cdot \tan\alpha/2}{1/r} \quad (5)$$

Equations (4) and (5) must be compared and the lower value of allowable torque is selected or it is necessary to establish the smaller of $$\left[c \frac{\overline{K}_c}{1/r}\right] \text{and} \left[c \frac{K_c}{1/r + 1/R_s}\right]$$

$\overline{K}_c$ is for a powdered metal housing/roller bearing combination $K_c$ is for a carburized shaft/roller bearing combination.

Published values of $K_c$ have been presented in technical journals and $\overline{K}_c$ values have been developed by physical testing. Values for both of these constants are shown by the curves in FIG. 11.

Using values of $K_c$ from these curves in Equation (4), the torque—fatigue life curves can be established for a six bearing clutch product line. However, before calculating allowable torque life curves based only on contact stresses, it is necessary to evaluate the housing stresses and evaluate their peak values against the fatigue strength of the housing material, in the instance sentered powdered ferrus metal.

Figure 8:
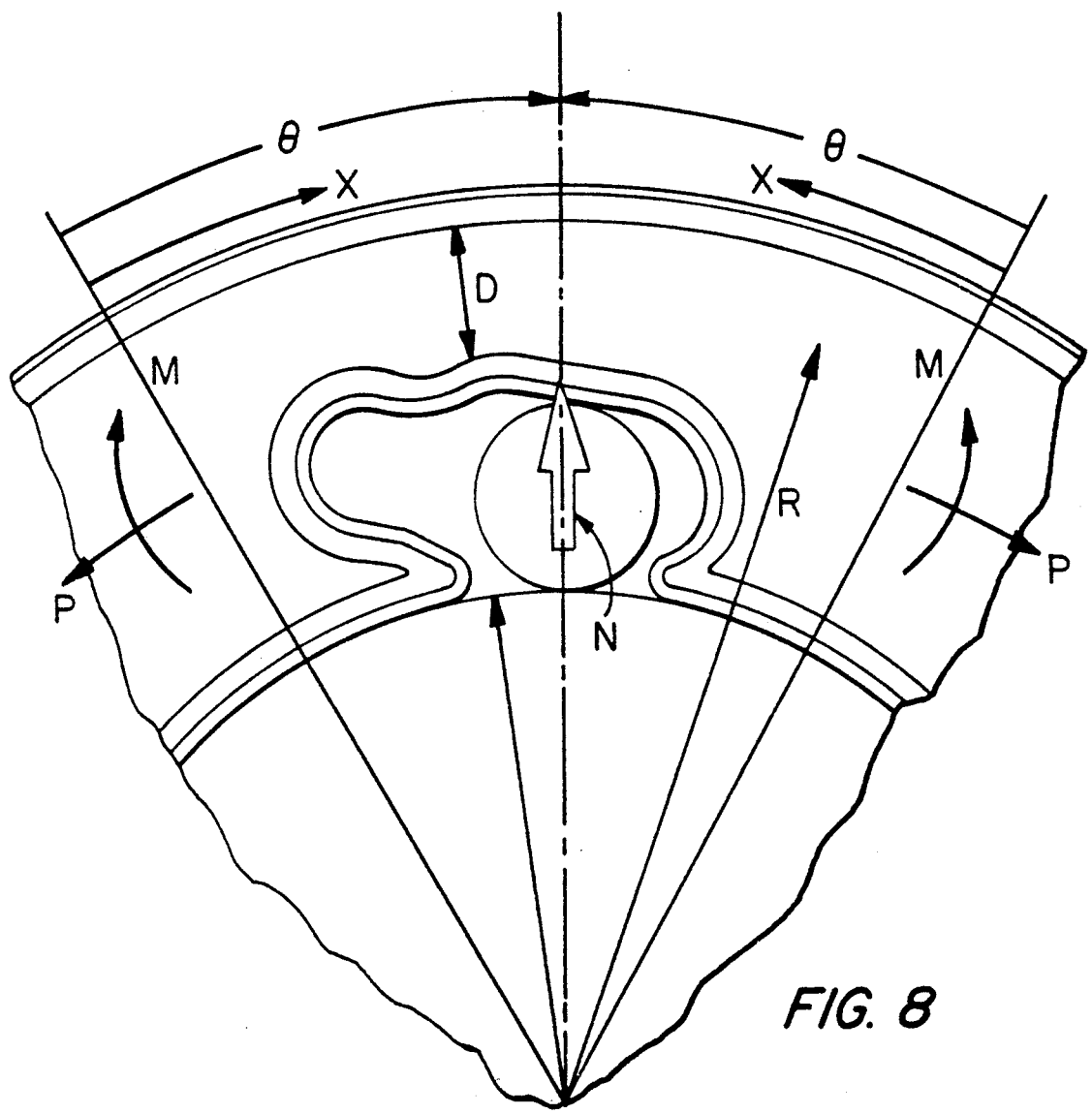

Turning now to FIG. 8, one can develop the loads and stress distribution. The general moment equation is $$M_x = \frac{1}{2} NR\left[\frac{\cos x}{\sin\theta} - \frac{1}{\theta}\right]$$

and the general hoop force equation is $$P_x = \frac{1}{2} N \cdot \frac{\cos x}{\sin\theta}$$

For a 6 roller being line of clutches $\theta = 30° = 0.5236$ Radians which allows the above equations to be rewritten as follows:

Moment at any angle $X$    Recalling equation (3)

$$M_x = NR[\cos x - 0.9549] = \frac{T \cdot R}{m \cdot R_s \cdot \tan\alpha/2}[\cos x - 0.9549] \quad (6)$$

Hoop force at any angle $X$    Recalling equation (3)

$$P_x = N\cos x = \frac{T}{n \cdot R_s \cdot \tan\alpha/2}[\cos x] \quad (7)$$

The preceding equations produce a combination of bending stress and hoop stress on the inside and outside surfaces of the housing which can be expressed by the following equations in which terms are defined for any angle "X" as:

$K_{xB}$ = Bending stress Concentration Factor: $1_x$ = moment of inertia
$K_{xT}$ = Hoop stress concentration factor: $A_x$ = cross sectional area The stresses on the inside surface are:

$$\hat{\sigma}_L = K_{xB} \cdot \frac{6M_x}{t \cdot D_x^2} + \frac{K_{xF} P_x}{tD_x} \quad (8)$$

The stresses on the outside surface are:

$$\hat{\sigma}_o = \frac{-6M_x}{t \cdot D_x^2} + \frac{P_x}{tD_x} \quad (9)$$

Figure 9:
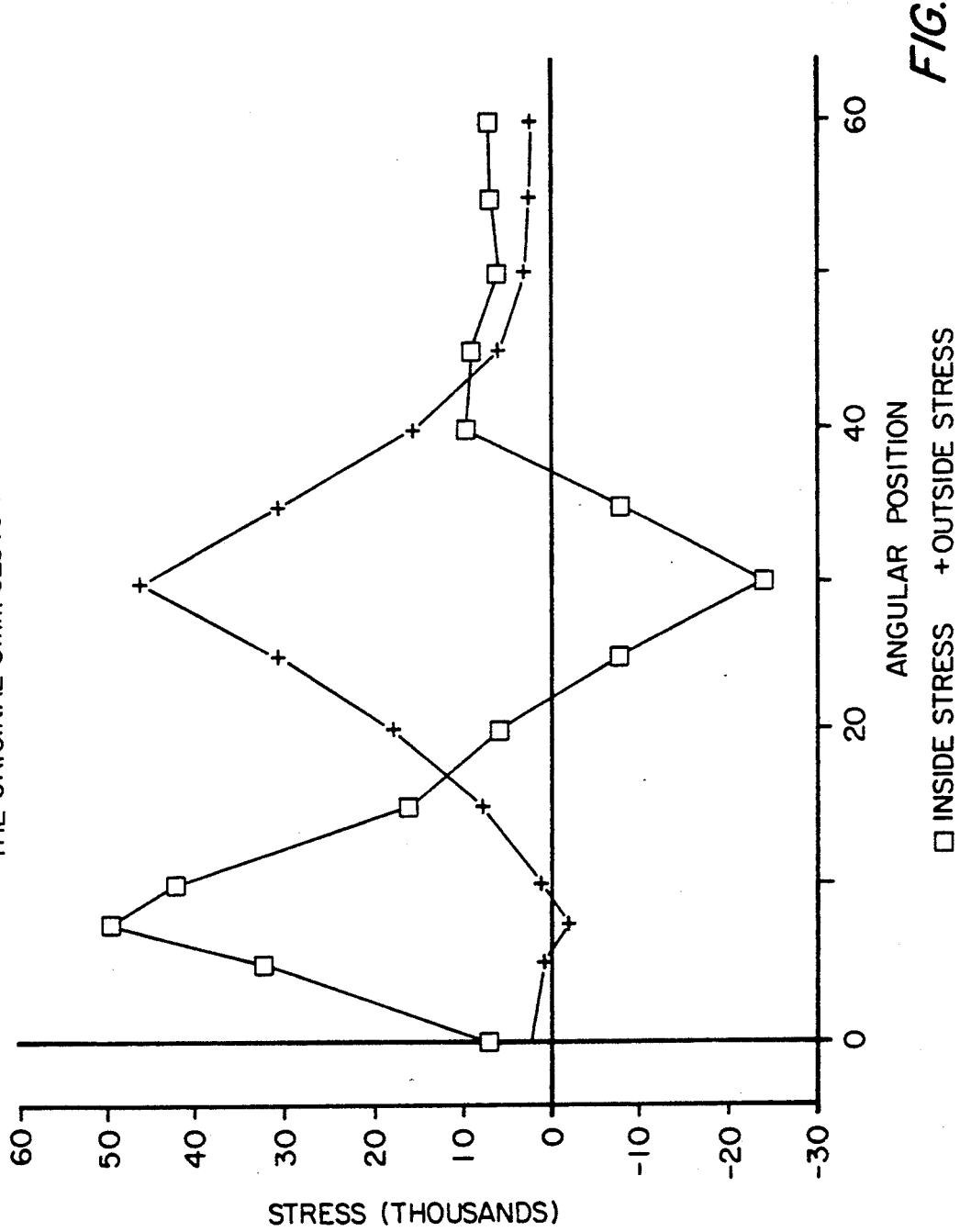
FIGS. 9-13 are graphic presentations of data relating to testing or analysis of the clutches embodying the present invention.
Figure 10:
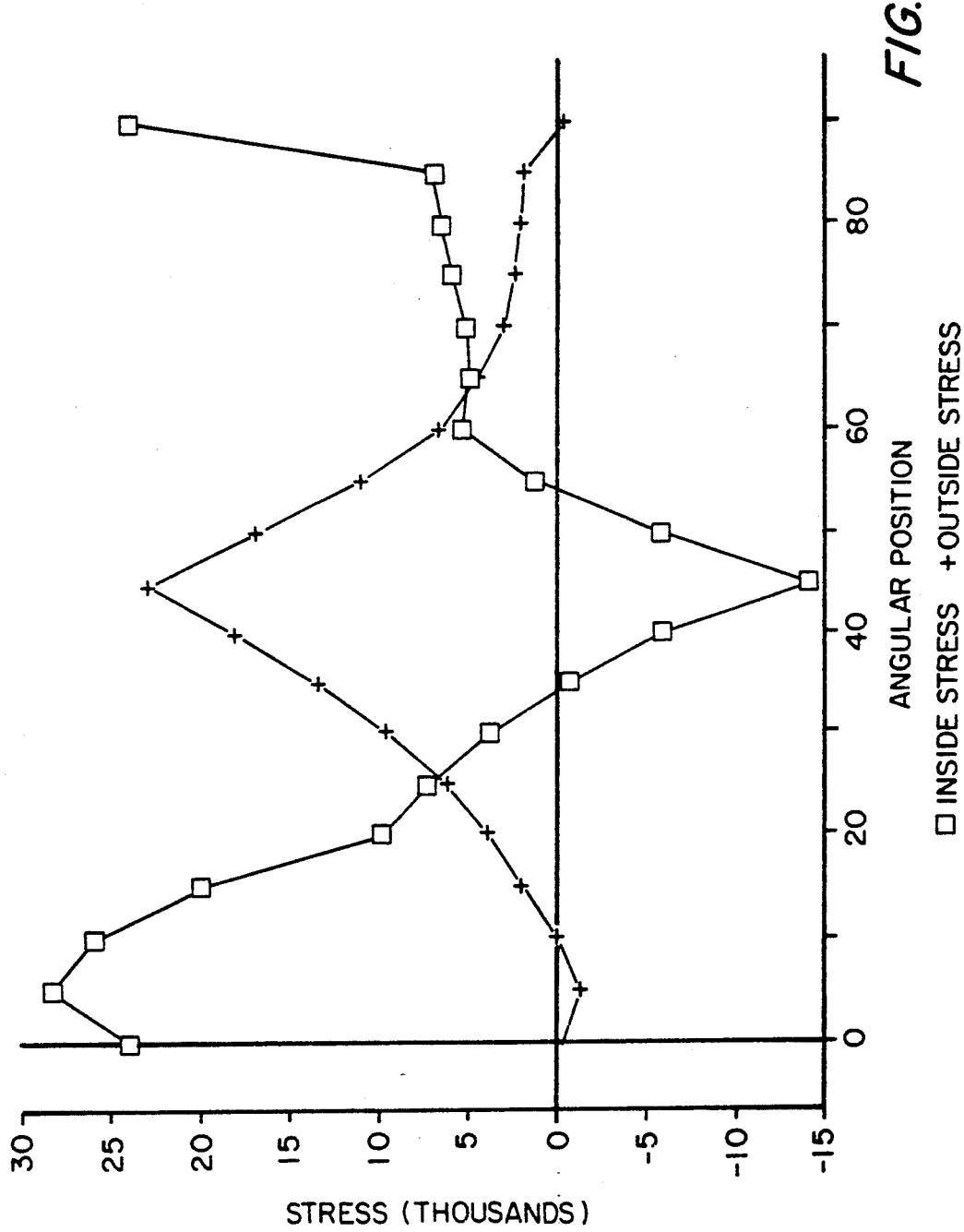

When the values of $M_x$ and $P_x$ (equations [6] and [7]) are substituted into Equations (8) and (9) along with appropriate stress concentration factors for the various fillets, these equations can be plotted as a function of the angle X and follow the general profiles, such as that shown in FIGS. 9 and 10.

Figures 11, 12:
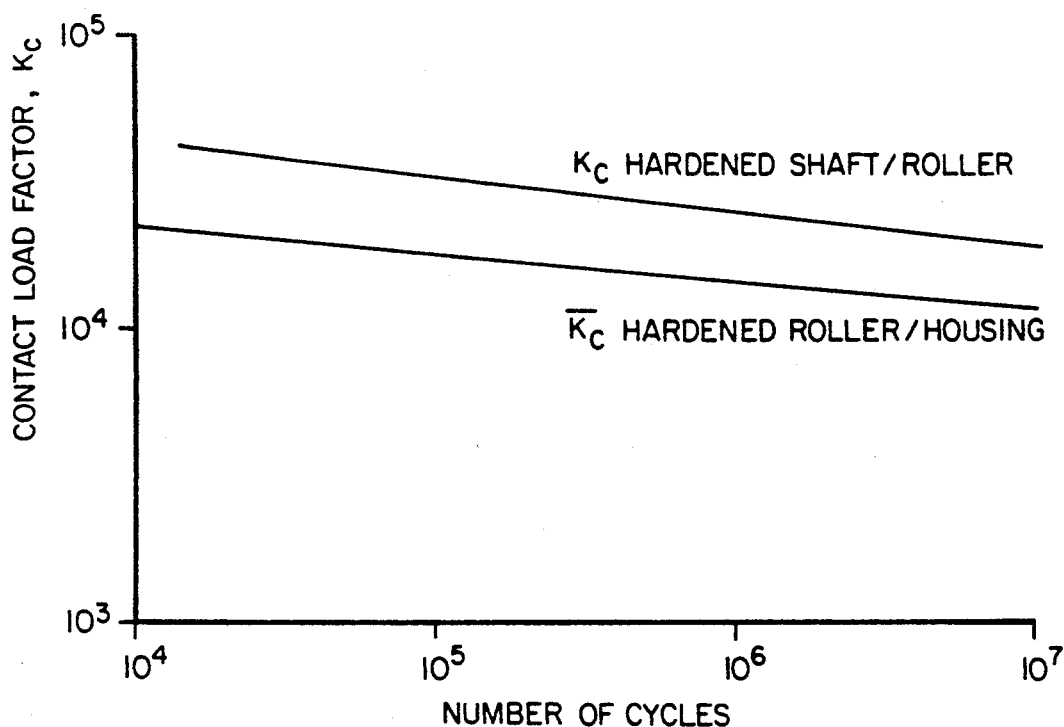
Figure 13:
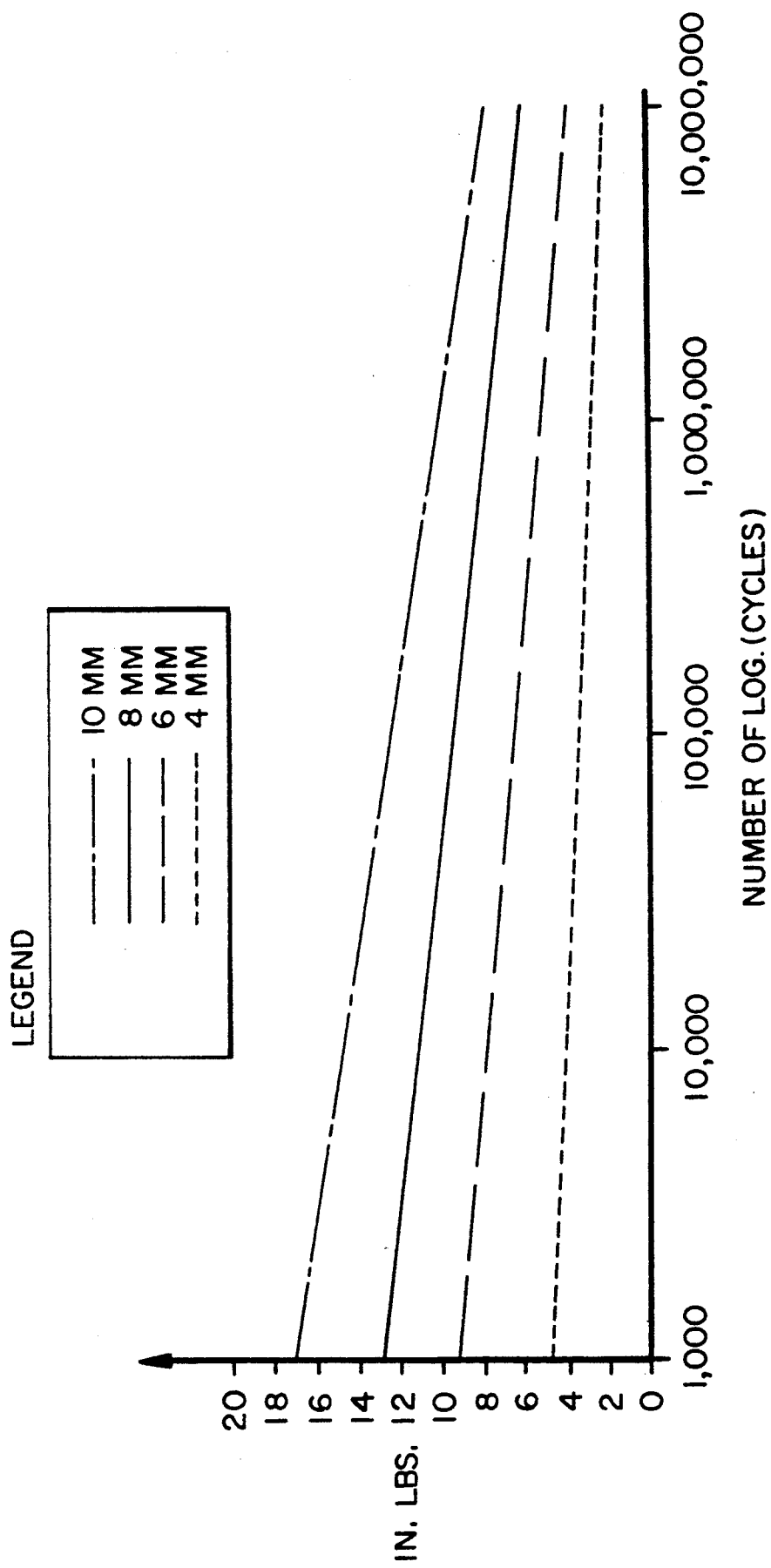

In FIG. 11 is graphically presented data relating to number of cycles which have been accommodated at various torque loadings.

Tolerance ranges, particularly with the allowable differences in shaft diameter will cause the roller to move over a range of ~±5° from the ideal central location. This range of tolerances can alter peak housing stresses by as much as 40+ percent and even more. Desirably, each line of clutches is analyzed for the maximum stress conditions imposed by limits of allowable tolerances.

In order to be able to establish the fatigue properties of the housing material, a series of fatigue tests may be conducted on clutches in the laboratory. These results are being developed in the form shown on FIG. 12.

The maximum tangential stress resulting from the clutch rotation occurs on the inside surface and is:

$$\sigma_{T/W} = \rho \frac{w^2}{g} \left( \frac{3+M}{4} \right) \left( R_o^2 + \frac{1-M}{3+M} L^2 \right) K_T \quad (10)$$

where
$\rho$ = Density = 0.28 lb/in$^3$;
g = Gravity Const = 3876 in/sec$^2$
W = Angular speed rad/sec
$K_I$ = Stress concentration < 2.0
for an 8 mm clutch, for example, operating at 10,000 RPM which adds less than 1% to the design torque imposed stresses.

In a similar fashion, it is possible to evaluate the radial deflection which, at the inside surface, is $$\Delta_{R/H/W} = \quad (11)$$

$$\frac{L}{E} \cdot \rho \cdot \frac{w^2}{g} \left( \frac{3+M}{4} \right) \left( R_o^2 + \frac{1-M}{3+M} L^2 \right) = \frac{L}{E} \sigma_{T/W}$$

At 10,000 RPM $\Delta_{R/H/W} = 1.4 \times 10^{-6}$ inches which is an insignificant radial deflection.

Circumstances could exists where the clutch housing could be installed in a metal housing which, for example, could run at a higher temperature than the shaft, i.e., conducting heat to the clutch housing.

In a situation where the housing might run at a higher temperature than the shaft/roller bearing assembly, the housing will want to expand radially. This relative radial deformation can be calculated by the following equation:

$$\underset{\text{Housing}}{\Delta} = (\alpha \cdot R \cdot (\text{Temp}_{\text{Housing}} - \text{Temp}_{\text{Shaft}}) \quad (12)$$

where $\alpha$ = coefficient of expansion
= 6 $\times$ 10$^{-6}$ in/in °F.
R = average housing radius For a 100° F. temperature differential:
$\Delta = 6 \times 10^{-6} \times 0.240 \times 100$
$\Delta = 0.000144$ inches As can be seen in the following, the radial growth resulting from a 100° F. temperature differential will not significantly reduce the torque capacity of the clutch or impair the mechanical properties of the clutch material.

As torque is applied to the shaft, it forces the roller bearings to wedge into the housing causing the housing to deflect radially. When this radial deflection of the housing, along with the compressive deflections of the roller bearings, shaft and housing surfaces exceed the radial interference, the clutch will reach its maximum torque and will start to override.

These characteristics can be determined experimentally. In addition, the clutch behavior can be expressed in an analytical formulation. The value of this analytical model not only serves as a design tool but also is an excellent way to help verify the stress analysis/design equations which have been used in sizing the clutch geometry.

The deflection characteristics of the clutch mechanism can be expressed as follows:

$$\delta_s + 2\delta_r + \delta_H + \Delta_{R/H} \geq R_s + d_r - L$$

When the deflections (shown on the left hand side of Equation (13)) exceed the interference (right hand side), the clutch will override.

A clutch line should be sized so that the radial interferences $(R_s + d_r = L)$ is at least 0.002 in. The task then is to establish the amount of torque which will cause the clutch components to deflect in excess of this 0.002 in. interference. The component deflections specified in equation (10) are defined as follows:

$\delta_s$ = Shaft $\delta_r$ = Roller Contact Load Deflections = $\delta_i$ =

$$R_i \cdot \left[ R_i^2 \cdot \frac{N}{\pi t} \cdot \frac{(1-M^2) \left( \frac{1}{E_i} + \frac{1}{E_j} \right)}{1/R_i + 1/R_j} \right]^{\frac{1}{2}}$$

$\delta_h$ = Housing $\Delta_{R/H}$ = Housing radial deflection $$\frac{N}{E} \left[ 1/2 \frac{R^3}{I} \left( \frac{1}{\sin^2\theta} \left\{ \frac{\theta}{2} + \frac{\sin\theta\cos\theta}{2} \right\} - \frac{1}{\theta} \right) + \frac{m}{2\pi t} \left( \frac{R_o^2 + L^2}{R_o^2 - L^2} + M \right) \right]$$

where $$N = \frac{T}{n \cdot R_s \cdot \tan\alpha/2}$$

These equations can be rearranged and solved for various clutch geometries taking into account both the material elastic/plastic properties and the geometry of the different clutch sizes—following a series of calculations and some amplifications:

$T_{ultimate} = 1.75 \times T_{elastic\ limit} \sim 35$ in/lb for 8 mm Clutch

These analytical results agree quite well with the experimental tests in the laboratory.

With proper design parameters, the design, analysis and experimental work which has been performed establish that a clutch line may have a conservative torque vs. cycles behavior; accommodate a large shaft tolerance range; need no external stiffening; operate to at least 10,000 RPM with no adverse effects; and has significant overtorque capacity.

Figure 18:
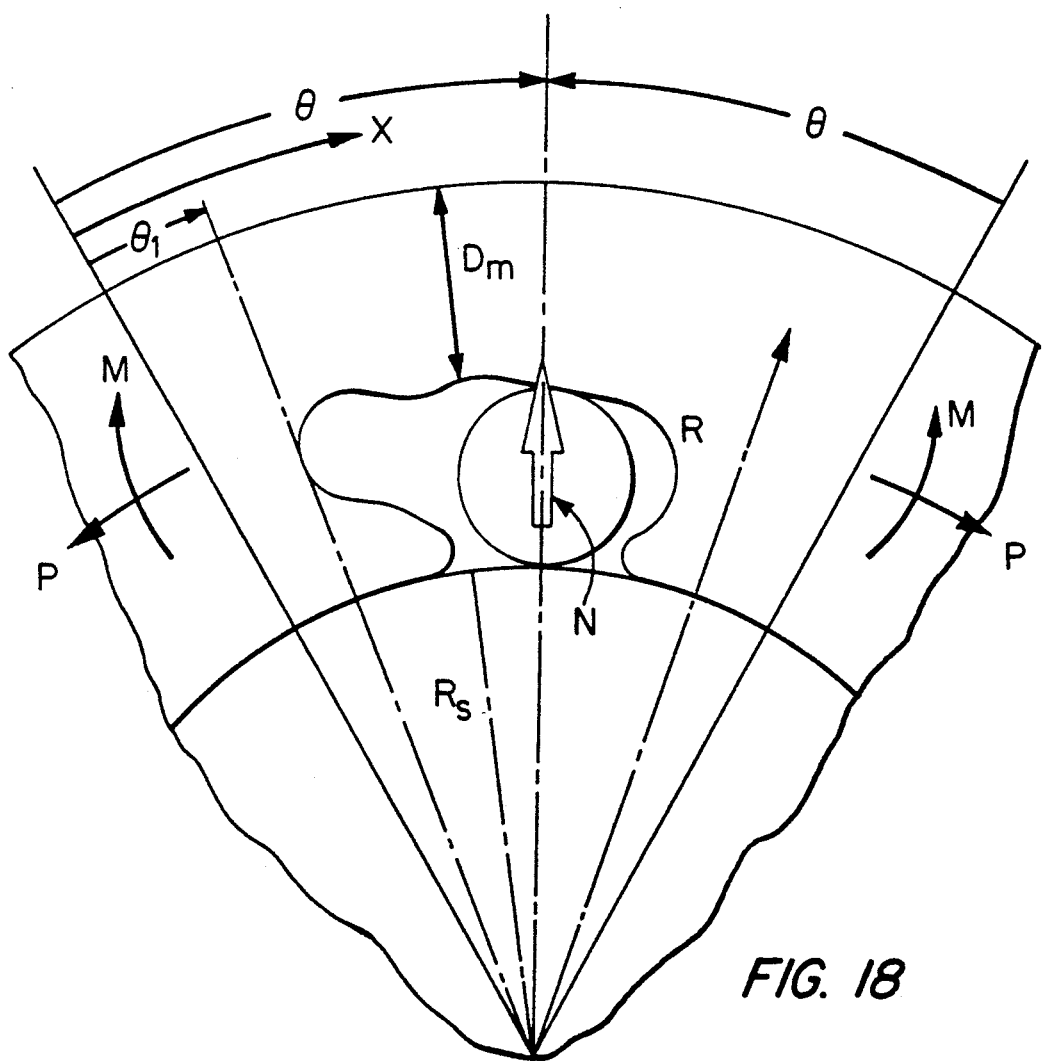
FIG. 18 is a schematic illustration of a clutch assembly identifying various design parameters for purposes of determining optimum construction for a clutch assembly of the present invention.

For convenience, the minimum housing wall thickness underlying the ramp surface of the recess should be at least equal to the larger of the two values derived from the following equations using the parameters seen in FIG. 18:

$$D_m = \left[ \frac{N}{2B\sigma} \left( 6K_{bi}A \left\{ \frac{\cos\theta_1}{\sin\theta} - \frac{1}{\theta} \right\} + K_{ti} \frac{\cos\theta_1}{\sin\theta} \right) \right]^{\frac{1}{2}}$$

OR $$D_m = \left[ \frac{N}{2B\sigma} \left( \frac{1}{\tan\theta} - 6K_{bo}A \left\{ \frac{1}{\tan\theta} - \frac{1}{\theta} \right\} \right) \right]^{\frac{1}{2}}$$

wherein the several factors seen in FIG. 6 are as follow:
$D_m$ = minimum wall thickness underlying the ramp surface
N = normal force transmitted to the housing by the roller bearing which is a vector of the force proportional to the normal torque on the shaft.

$$N = \frac{T}{n \cdot R_s \cdot \tan\left(\frac{\alpha}{2}\right)}$$

T = input torque
n = number of recesses
$R_s$ = shaft radius
$\alpha$ = recess angle
R = $AD_m$ = housing radius
t = $BD_M$ = housing thickness
A = input constant (assumed or manipulated)
B = input constant
$\sigma$ = allowable working stress
$K_{bi}$ = stress concentration factor in bending including curved beam effect on the inside of housing OR
$K_{bo}$ = stress concentration factor in bending including curved beam effect on the outside of housing
$K_{ti}$ = stress concentration factor from hoop effect on inside of housing and wherein the optimum value of cos $\theta_1$ is equal to the following:

$$\cos\theta_1 = \left[ \frac{\frac{\cos\theta}{\sin\theta} + 6K_{bo}A\left(\frac{1}{\theta} - \frac{\cos\theta}{\sin\theta}\right) + \frac{6K_{bi}A}{\theta}}{\frac{6K_{bi}A}{\sin\theta} + \frac{k_{ti}}{\sin\theta}} \right]$$

wherein $$\theta = \frac{\pi \text{ radians}}{\text{no. of recesses}}$$

Turning now to FIGS. 14-17, schematically illustrated are several conditions using a drive roller 50 containing the clutch assembly of the present invention forming a nip with a driven roller 52.

Figure 14:
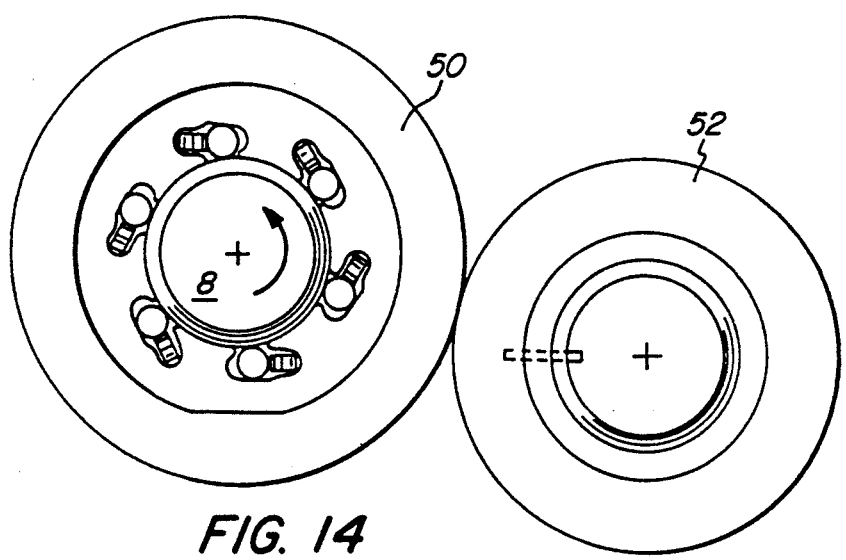
FIGS. 14-17 are partially schematic illustration of the clutch assembly, a shaft and a roller providing a nip with a second roller showing the relationship to illustrate various load conditions.

In FIG. 14, the drive shaft 8 is being rotated in the counterclockwise direction allowing the bearings 32 to move down the ramp surfaces. As a result, there is no frictional drive imparted to the roller bearings and the shaft 8 is the only rotating element.

Figure 15:
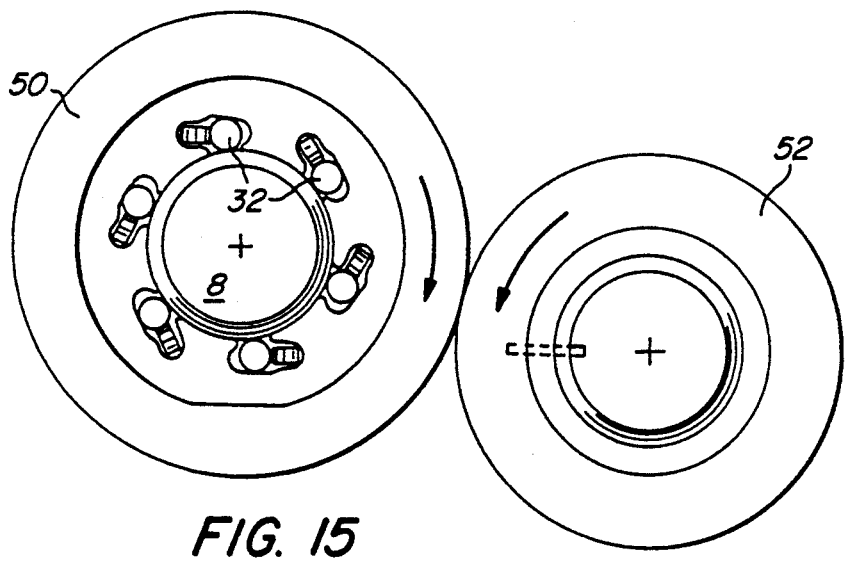

In FIG. 15, the shaft 8 is rotating in its normal direction causing the roller bearings 32 to move along the ramp surface until frictional engagement develops. This then effects rotation of the clutch assembly, the roller 50 and the roller 52.

Figure 16:
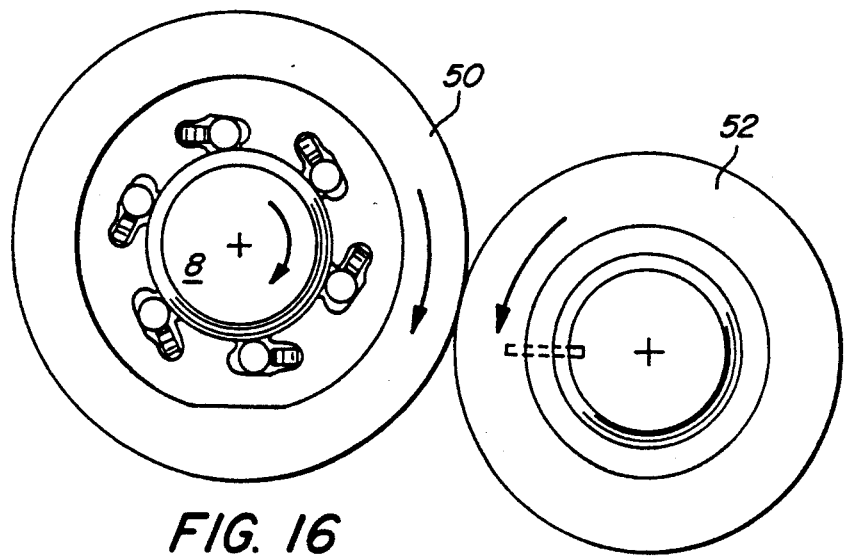

In FIG. 16, the shaft 8 is subjected to a torque in excess of the torque transfer capabilities designed into the clutch. This causes the roller bearings to move further along the ramp surfaces where the load produces deformation of the wall section of the housing thereunder. As a result, the rollers move from surface driving engagement with the shaft 8 and the clutch overrides.

Figure 17:
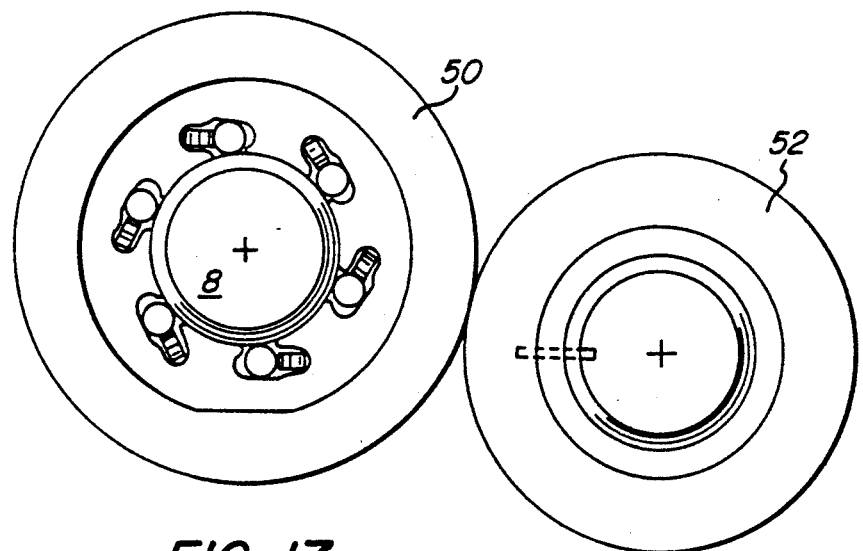

In FIG. 17, the shaft 8 continues to rotate but the clutch and rollers are not rotating or rotating at a slower speed.

Although the clutch of the present invention has been described as one which will override and which is designed to accommodate the deflection required to permit overriding without destruction of the clutch, the design parameters which have been developed for the clutch housing as hereinbefore set forth will accommodate a wide range of torque loadings and repeated high torque loadings without producing the distortion of the housing which would produce an override. This is significant and greatly extends the life of the clutch and provides a high degree of safety in the operation of the clutch to minimize breakdowns in service of the units in which it is used.

To accomplish this result, the clutch design has been developed so that the wall section underlying the bearings accommodates the stresses which would produce distortion in the housing as a result of the high torque loadings and enables this to be done repeatedly. Yet, under conditions of extreme torque loading, the design will permit limited distortion of the housing within the elastic/plastic limits of the material to enable the clutch to disengage to produce an override condition and recover after the excess torque has been alleviated or the unit has been stopped and restarted.

Although as few as three roller bearings will function in accordance with the present invention, generally four to eight roller bearings spaced equidistantly about the housing are preferred. With six roller bearings, it has been found that a wide variation in the shaft diameters and torque loadings, etc., can be readily accommodated with proper design. However, if the shaft diameter is sufficiently small, then the number of roller bearings obviously must be reduced because of the limited circumference.

Although the housing can be machined from bar or plate stock, it has been found that highly effective structures can be fabricated by powder metallurgy. Although titanium, nickel and other high strength metals and their alloys may be employed, ferrous metal alloys have been found quite satisfactory and are more economical. Moreover, when the anticipated loadings are small and the application is not one which requires a wide range of operating parameters, the housing can be fabricated from high strength synthetic resins such as the engineering grade resins, and it may also be fabricated from ceramics.

Moreover, the ability to resist distortion of the housing during various torque loadings enables this clutch to be used not only in metal gears, pulleys rolls and the like, but also to function very well in synthetic resin structures.

As will be readily appreciated from the foregoing detailed description and attached drawings, the novel clutch assembly of the invention may be preassembled from a relative minimum of parts to provide a relatively long-lived structure capable of operating over a wide range of torque loadings. The design enables the accommodation of relatively high torque loads repeatedly and will even accommodate such excessive torque loads as will produce the elastic deformation of the housing required to permit the clutch to override the shaft.

Having thus described the invention, what is claimed is:

1. An overriding clutch adapted for use within associated structures and adapted to receive a shaft therein comprising:
   (a) a housing of generally annular cross section having an outer periphery and an inner periphery defining a passage therethrough to receive an associated shaft, said inner periphery having at least three recesses equidistantly spaced thereabout, said recesses having a radial throat portion opening at said inner periphery and a generally secantally extending portion spaced from said inner periphery and elongated in a first circumferential direction which is opposite the direction of rotation of an associated shaft which the clutch is to receive in said passage, said recesses having a radial depth defined by a distance between said inner periphery of said housing and a radially outer surface of said secantally extending portion, said radially outer surface of said secantally extending portion having a secantally extending rectilinear ramp portion which is inwardly inclined in the circumferential direction which is opposite to said first circumferential direction to a smaller radial dimension, said ramp surface being included at an angle of about 9° from an imaginary line perpendicular to a radial line extending through its end of smaller radial dimension;
   (b) a roller bearing in each said recess and having a diameter slightly larger than said throat so as to be radially retained in said recess, said radial depth of said recess to said ramp surface being less than the diameter of said roller bearing so that the outer circumference of said roller being extends radially inwardly of the inner periphery of said housing to provide a bearing surface for the associated shaft seated therein, said bearing seating directly on and bearing upon said ramp surface and applying forces directly thereto along essentially a line extending axially along its periphery; and
   (c) resiliently deflectable biasing means in said elongated portion of said recess biasing said roller bearing away therefrom and along said ramp surface, said housing having a wall thickness outwardly of said recess sufficient to resist deformation under normal stresses placed thereon through the bearing by a torque applied to the shaft but being resiliently deformable by excess torque on the shaft whereupon said clutch will override.

2. The overriding clutch in accordance with claim 1 wherein said housing is fabricated from sintered metal.

3. The overriding clutch in accordance with claim 1 wherein said metal is ferrous.

4. The overriding clutch in accordance with claim 1 wherein said biasing means is a leaf spring.

5. The overriding clutch in accordance with claim 4 wherein said leaf spring is a reversably bent member having a pair of radially spaced legs extending generally secantally of said housing in radially spaced relationship, a radially inwardly disposed leg initially diverging from a radially outwardly disposed leg adjacent its juncture therewith and having its end portion inclined towards said radially outwardly disposed leg.

6. The overriding clutch in accordance with claim 1 wherein said recesses have an arcuate portion extending from said ramp portion to the surface of said throat opposite said elongated portion.

7. The overriding clutch in accordance with claim 1 wherein said clutch includes an end portion on said housing to limit axial movement of said biasing means and bearings in said recesses and thereby retain them in said recesses.

8. The overriding clutch in accordance with claim 1 wherein said housing has four to eight recesses with bearings therein.

9. An overriding clutch adapted for use within associated structures and adapted to receive a shaft therein and comprising:
   (a) a housing of generally annular cross section having an outer periphery and an inner periphery defining a passage therethrough to receive an associated shaft, said inner periphery having at least three recesses equidistantly spaced thereabout, said recesses having a radial throat portion opening at said inner periphery and a generally secantally extending portion spaced from said inner periphery and elongated in a first circumferential direction which is opposite a direction of rotation of an associated shaft which the clutch is to receive in said passage, said recesses having a radial depth defined by a distance between said inner periphery of said housing and a radially outer surface of said secantally extending portion, said radially outer surface of said secantally extending portion having a secantally extending rectilinear ramp portion which is inwardly inclined in a circumferential direction which is opposite to said first circumferential direction to a smaller radial dimension;
   (b) a roller bearing in each said recesses and having a diameter slightly larger than said throat so as to be radially retained in said recess, said radial depth of said recess to said ramp surface being less than the diameter of said roller bearing so that the outer circumference of said roller bearing extends radially inwardly of the inner periphery of said housing to provide a bearing surface for the associated shaft seated therein, said bearing seating directly on and bearing upon said ramp surface and applying forces directly thereto along essentially a line extending axially along its periphery; and
   (c) resiliently deflectable biasing means in said elongated portion of said recess biasing said roller bearing away therefrom and along said ramp surface, said housing having a wall thickness outwardly of said recess sufficient to resist deformation under normal stresses placed thereon through the bearing by the torque applied to the shaft but being resiliently deformable by excess torque on the shaft whereupon said clutch will override, said housing wall thickness ($D_m$) underlying said recess being at least equal to the larger of the following equations:

$$D_m = \left[ \frac{N}{2B\sigma} \left( 6K_{bi}A \left( \frac{\cos\theta_1}{\sin\theta} - \frac{1}{\theta} \right) + K_{ti}\frac{\cos\theta_1}{\sin\theta} \right) \right]^{\frac{1}{2}}$$

OR $$D_m = \left[ \frac{N}{2B\sigma} \left( \frac{1}{\tan\theta} - 6K_{bo}A \left( \frac{1}{\tan\theta} - \frac{1}{\theta} \right) \right) \right]^{\frac{1}{2}}$$

wherein the several factors are as follows:

$D_m$ = minimum wall thickness underlying the ramp surface

N = normal force transmitted to the housing by the roller bearing which is a vector of the force proportional to the normal torque on the shaft $$N = \frac{T}{n \times R_s \times \tan\left(\frac{\alpha}{2}\right)}$$

T = input torque
n = number of recesses
$R_8$ = shaft radius
α = recess angle
R = $AD_m$ = housing radius
t = $BD_m$ = housing thickness
A = input constant (assumed or manipulated)
B = input constant
σ = allowable working stress
$K_{bi}$ = stress concentration factor in bending including curved beam effect on the inside of housing OR
$K_{bo}$ = stress concentration factor in bending including curved beam effect on the outside of housing
$K_{ti}$ = stress concentration factor from hoop effect on inside of housing and wherein the optimum value of cos $θ_1$ is equal to the following:

$$\cos θ_1 = \left[\frac{\frac{\cos θ}{\sin θ} + 6K_{bo}A\left(\frac{1}{θ} - \frac{\cos θ}{\sin θ}\right) + \frac{6K_{bi}A}{θ}}{\frac{6K_{bi}A}{\sin θ} + \frac{k_{ti}}{\sin θ}}\right]$$

wherein $$θ = \frac{\pi \text{ radians}}{\text{no. of recesses}}.$$

10. An overriding clutch adapted for use within associated structures and adapted to receive a shaft therein comprising:

(a) a metallic housing of generally annular cross section having an outer periphery and an inner periphery defining a passage therethrough to receive an associated shaft, said inner periphery having at least three recessed equidistantly spaced thereabout, said recesses having a radial throat portion opening at said inner periphery and a generally secantally extending portion spaced from said inner periphery and elongated in a first circumferential direction which is opposite a direction of rotation of an associated shaft which the clutch is to receive in said passage, said recesses having a radial depth defined by the distance between said inner periphery of said housing and the radially outer surface of said secantally extending portion, said radially outer surface of said secantally extending portion having a secantally extending rectilinear ramp portion which is inwardly inclined in a circumferential direction which is opposite to said first circumferential direction to a smaller radial dimension, said recesses having an arcuate portion extending from said ramp portion to a side of said throat opposite said elongated portion, said ramp surface being inclined at an angle of about 9+ from an imaginary line perpendicular to a radial line through its end of smaller radial dimension;

(b) a roller bearing in each said recess and having a diameter slightly larger than said throat so as to be radially retained in said recess, said radial depth of said recess to said ramp surface being less than the diameter of said roller bearing so that the outer circumference of said roller bearing extends radially inwardly of the inner periphery of said housing to provide a bearing surface for the associated shaft seated therein; and (c) resiliently deflectable biasing means in said elongated portion of said recess biasing said roller bearing away therefrom and along said ramp surface, said housing having a wall thickness outwardly of said recess sufficient to resist deformation under normal stresses placed thereon through the bearing by a torque applied to the shaft but being resiliently deformable by excess torque on the shaft whereupon said clutch will override.

11. The overriding clutch in accordance with claim 10 wherein said metal is ferrous.

12. The overriding clutch in accordance with claim 10 wherein said biasing means is a leaf spring provided by a reversably bent member having a pair of legs extending generally secantally of said housing with the radially inwardly disposed leg initially diverging from a radially outwardly disposed leg adjacent its juncture therewith and having its end portion inclined towards said radially outwardly disposed leg.

13. The overriding clutch in accordance with claim 10 wherein said clutch includes an end portion on said housing to limit axial movement of said biasing means and bearings in said recesses and thereby retain them in said recesses.

14. The overriding clutch in accordance with claim 10 wherein said housing wall thickness ($D_m$) underlying said recess is at least equal to the larger of the following equations:

$$D_m = \left[\frac{N}{2Bσ}\left(6K_{bi}A\left(\frac{\cos θ_1}{\sin θ} - \frac{1}{θ}\right) + K_{ti}\frac{\cos θ_1}{\sin θ}\right)\right]^{\frac{1}{2}}$$

OR $$D_m = \left[\frac{N}{2Bσ}\left(\frac{1}{\tan θ} - 6K_{bo}A\left(\frac{1}{\tan θ} - \frac{1}{θ}\right)\right)\right]^{\frac{1}{2}}$$

wherein the several factors are as follows:

$D_m$ = minimum wall thickness underlying the ramp surface

N = normal force transmitted to the housing by the roller bearing which is a vector of the force proportional to the normal torque on the shaft $$N = \frac{T}{n \cdot R_s \cdot \tan\left(\frac{\alpha}{2}\right)}$$

T = input torque
n = number of recesses
$R_8$ = shaft radius
α = recess angle
R = $AD_m$ = housing radius
t = $BD_m$ = housing thickness
A = input constant (assumed or manipulated)

B = input constant
σ = allowable working stress
$K_{bi}$ = stress concentration factor in bending including curved beam effect on the inside of the housing OR
$K_{bo}$ = stress concentration factor in bending including curved beam effect on the outside of housing
$K_{ti}$ = stress concentration factor from hoop effect on inside of housing
and wherein the optimum value of $\cos \theta_1$ is equal to the following:

$$\cos\theta_1 = \left[ \frac{\frac{\cos\theta}{\sin\theta} + 6K_{bo}A\left(\frac{1}{\theta} - \frac{\cos\theta}{\sin\theta}\right) + \frac{6K_{bi}A}{\theta}}{\frac{6K_{bi}A}{\sin\theta} + \frac{k_{ti}}{\sin\theta}} \right]$$

wherein $$\theta = \frac{\pi \text{ radians}}{\text{no. of recesses}}.$$

* * * * *

UNITED STATES PATENT AND TRADEMARK OFFICE
CERTIFICATE OF CORRECTION

PATENT NO. : 5,211,274

DATED : May 18, 1993

INVENTOR(S) : Arthur J. J. Milano Jr., and W. H. Tuppeny, Jr.

It is certified that error appears in the above-identified patent and that said Letters Patent is hereby corrected as shown below:

Column 13, line 28, please delete "included" and insert --inclined--; line 37, please delete "being" and insert --bearing--.

Column 15, line 49, please delete "recessed" and insert --recesses--; line 68, please delete "9+" and insert --9°--.

Signed and Sealed this

Twenty-ninth Day of March, 1994

*Attest:*

BRUCE LEHMAN

*Attesting Officer*     *Commissioner of Patents and Trademarks*